United States Patent [19]
Tomiku et al.

[11] Patent Number: 5,552,073
[45] Date of Patent: Sep. 3, 1996

[54] FERROMAGNETIC FINE PARTICLES OF ε IRON CARBIDE AND METHOD FOR PRODUCING THE SAME

[75] Inventors: Yasushi Tomiku; Hideaki Takano, both of Wakayama-ken; Yoshichika Bando, Shiga-ken, all of Japan

[73] Assignees: Seisan Kaihatsu Kagaku Kenkyusho, Kyoto-fu, Japan; Kyodo Oxygen Co., Ltd., Wakayama-ken, Japan

[21] Appl. No.: 115,806

[22] Filed: Sep. 3, 1993

Related U.S. Application Data

[63] Continuation of Ser. No. 678,932, Apr. 3, 1991, abandoned, which is a continuation-in-part of Ser. No. 412,771, Sep. 26, 1989, abandoned.

[30] Foreign Application Priority Data

Sep. 26, 1988 [JP] Japan .................................. 2-41789
Aug. 28, 1989 [JP] Japan .................................. 2-22650

[51] Int. Cl.$^6$ .................................................. C01B 31/30
[52] U.S. Cl. ......................... 252/62.55; 252/62.51 R; 252/62.51 C; 423/439
[58] Field of Search ........................ 252/62.51, 62.55; 423/439

[56] References Cited

U.S. PATENT DOCUMENTS 4,668,414  5/1987  Okamura et al. .................... 252/62.51

OTHER PUBLICATIONS

Bourdon et al "Chem Abstracts", vol. 54, 8361a, 1960 No Month.
J. Phys. Chem., vol. 64, Nov. 1960, pp. 1720–1722.
J. Amer. Chem. Soc., vol. 81, Apr. 5, 1959, pp. 1576–1582.
J. Amer. Chem. Soc., vol. 71, Jan. 1949, pp. 189–195.

*Primary Examiner*—Melissa Bonner
*Attorney, Agent, or Firm*—Wenderoth, Lind & Ponach

[57] ABSTRACT

Ferromagnetic granular ultrafine particles consisting essentially of ε' iron carbide represented by the composition formula:

$$\varepsilon'\text{-Fe}_{2.2}\text{C}$$

having an average particle size of about 0.01 to 0.2 μm, and ferromagnetic acicular ultrafine particles consisting essentially of ε' iron carbide represented by the composition formula:

$$\varepsilon'\text{-Fe}_{2.2}\text{C}$$

having a major axis of about 0.05 to 0.5 μm, a minor axis of about 0.01 to 0.06 and an axial ratio of 4 to 20, which have good coercive force and a small magnetic domain.

26 Claims, 4 Drawing Sheets

FERROMAGNETIC FINE PARTICLES OF ε' IRON CARBIDE AND METHOD FOR PRODUCING THE SAME

This application is a continuation of now abandoned application, Ser. No. 07/678,932, filed Apr. 3, 1991, which is a continuation-in-part application of application Ser. No. 07/412,771 filed on Sep. 26, 1989, now abandoned.

BACKGROUND OF THE INVENTION

1. Field of the Invention

The present invention relates to ferromagnetic fine particles of ε' iron carbide and a method for producing the same. More particularly, the present invention relates to ferromagnetic fine particles of ε' iron carbide having a composition of ε'-$Fe_{2.2}C$ and a specific particle shape and size, and a method for producing such ferromagnetic fine particles of iron carbide.

2. Description of the Related Art

As magnetic recording materials, magnetic metal oxides or metals such as acicular γ-$Fe_2O_3$, $CrO_2$, α-Fe and the like are used.

Since γ-$Fe_2O_3$ has small coercive force, shape anisotropy has to be induced through increase of its acicular ratio or crystalline anisotropy has to be imparted through coating of particle surfaces with cobalt oxide.

Although $CrO_2$ has good magnetism and particle shape (acicular shape), its Curie temperature is low so that its characteristics considerably vary with temperature. Therefore, a magnetic recording medium of $CrO_2$ as the magnetic material should be used under very limited conditions. Further, a magnetic tape containing $CrO_2$ particles causes heavy wear of a magnetic head, and formed Cr(IV) pollutes the environment.

Since α-Fe powder has a higher coercive force and at least twice larger value of magnetization than γ-$Fe_2O_3$, it will satisfy requirements for high density recording. However, since the metal powder has high chemical reactivity, its production process is somewhat complicated and the powder should be carefully treated. After the particles are formed into the tape, deterioration of magnetic properties due to oxidation should be prevented and abrasion because of softness of metal should be prevented. Further, a specific surface area of α-Fe acicular particles to be used in an 8 mm video tape should be increased. However, according to the conventional method, increase of the specific surface area of α-Fe powder will lead to decrease of magnetization, and at a specific surface area of 80 to 100 m$^2$/g, α-Fe powder tends to be converted to simple iron oxide. Then, such defects should be removed (see Tatsuji KITAMOTO, "Kagaku Sosetsu" (Survey on Chemistry) No. 48, "Fine Grain , its Chemistry and Applications" edited by the Chemical Society of Japan, Gakkai-shuppan Center (1985)).

With respect to the acicular magnetic particles for magnetic recording which utilizes shape magnetic anisotropy and is said to have been firstly proposed by M. Camras (cf. Japanese Patent Publication No. 776/1951), the acicular particles suffer from the above described defects or print through. At present, decrease of the particle size has its limit.

Iron carbide for magnetic recording includes spherical iron carbide (cf. U.S. Pat. No. 3,572,993) and iron carbide comprising χ-$Fe_5C_2$ (cf. Japanese Kokai Patent Publication No. 111923/1986). Both of them comprise χ-$Fe_5C_2$ as the main component and are a mixture of said main component and other iron carbide such as ε-$Fe_2C$, ε'-$Fe_{2.2}C$, θ-$Fe_3C$, etc. Then, they are expressed by a composition formula: $Fe_xC$ wherein x is a number not smaller than 2 and not larger than 3.

The spherical iron carbide is of fine particles having an average particle size of 0.005 to 0.1 μm and a coercive force of 500 to 700 Oe, which is smaller than the reported coercive force of iron carbide (J. Phys. Chem., Vol. 64, 1720 (1960)). It is produced by reacting a steamed aggregate of iron carbonyl with carbon monoxide or a mixture of carbon monoxide and hydrogen. It is dangerous to use iron carbonyl which easily ignites and explodes in the air.

The iron carbide comprising χ-$Fe_5C_2$ partly contains fine particles having an average particle size of 0.1 to 5 μm and an average axial ratio of 1.0 to 3.0 or more than 3. However, most of the particles cannot be fine grains. It has magnetic characteristics such as saturation magnetization of 50 to 90 emu/g and coercive force of 400 to 900 Oe. In addition, the magnetic characteristics largely scatter.

The iron carbide comprising χ-$Fe_5C_2$ can be produced by reducing iron oxyhydroxide or iron oxide with hydrogen and reacting the reduced product with a reducing and carbonizing agent containing carbon and optionally hydrogen. Since the reduction with hydrogen is carried out in a temperature range from 200° to 700° C., at higher temperature, the particles tend to be sintered together. Further, since the carbonization temperature is comparatively high, such as 250° to 400° C., the particle size distribution is broadened or carbon is deposited at a high deposition rate, which makes it difficult to control the composition of the final product of iron carbide. Thereby, the magnetic characteristics scatter, and the deposited carbon deteriorates the magnetic characteristics. In addition, a fair amount of $Fe_3O_4$ and carbon which further makes it difficult to control the composition remain in the product.

As described above, many processes for producing iron carbide have been proposed. However, by the conventional processes, only the iron carbide comprising χ'-$Fe_5C_2$ as the main component can be obtained, and by-products such as ε'-$Fe_2C$, ε'-$Fe_{2.2}C$, θ-$Fe_3C$ and the like are present as mixed phases in ε'-$Fe_5C_2$, which by-products cannot be isolated.

According to J. Amer. Chem. Soc., vol. 81, 1576 (1959), the value of saturation magnetization of the carbide phase is larger on the order of ε'-$Fe_{2.2}C$>θ-$Fe_3C$>χ-$Fe_5C_2$. Therefore, ε' iron carbide is highly promising as a magnetic recording element.

SUMMARY OF THE INVENTION

One object of the present invention is to provide ferromagnetic granular or acicular ultrafine particles of ε' iron carbide which is present in a single phase, that is, without mixing of α-Fe, $Fe_3C$ and/or χ-$Fe_5C_2$ and which may contain at least one other metal atom such as Co, Cu, Cr, Zn, Mn, V, Ti, Mo, W, Al, Sn, etc. present in a substitution solid solution state.

Another object of the present invention is to provide a process for producing ferromagnetic granular or acicular ultrafine particles of ε' iron carbide.

DETAILED DESCRIPTION OF THE INVENTION

According to the first aspect of the present invention, there is provided ferromagnetic granular ultrafine particles consisting essentially of ε' iron carbide represented by the composition formula:

$$\varepsilon'\text{-Fe}_{2.2}\text{C}$$

having an average particle size of about 0.01 to 0.2 μm.

Herein, the term "granular particles" is intended to mean particles having spherical, cubic, spheroidal (having an axial ratio of not larger than 3) or hexagonal shape, preferably spherical or cubic shape.

The ferromagnetic granular ultrafine ε' iron carbide particles of the present invention may be prepared by reacting iron metal powder with a reducing and carbonizing agent containing carbon and optionally a reducing agent containing no carbon at a temperature of not higher than 240° C., preferably from 180° to 240° C., more preferably from 195° to 225° C.

Preferably, the iron metal powder is body-centered cubic lattice iron, namely α-Fe which consists essentially of iron atoms. The iron metal powder preferably has an average particle size of 0.01 to 0.2 μm In one embodiment, the iron metal powder is coated with an inorganic compound.

Examples of the inorganic compound for coating the iron metal powder are silicon compounds (e.g. sodium silicate, potassium silicate, silane-coupling agents, etc.), aluminum compounds (e.g. sodium aluminate, potassium aluminate, aluminum base coupling agents, etc.), phosphorus compounds (e.g. phosphate esters, phosphate salts, etc.), titanium compounds (e.g. titanium base coupling agents), boron compounds (e.g. a reaction product of boric acid with a polyhydric alcohol having neighboring hydroxyl groups such as glycerin, for example, polyoxyethyleneglycerol borate laurate, polyoxyethyleneglycerol borate stearate), aliphatic carboxylic acids and their salts (e.g. aliphatic acids having 12 to 20 carbon atoms and their alkali metal salts, alkaline earth metal salts or ammonium salt, such as oleic acid, coconut oil fatty acid, sodium oleate), or mixtures thereof. The inorganic compound can be applied to the particles by dispersing the particles in a solution of the inorganic compound at a suitable concentration. The pH of the suspension can be adjusted to 6 to 7. Then, the suspension is washed with water and filtered, and the filtered particles are dried and ground.

Examples of the reducing and carbonizing agent are a mixture of carbon monoxide and hydrogen, an organic compound which is conventionally used as the reducing and carbonizing agent (eg. methane, ethane, propane, butane, acetylene, etc.). A preferred example of the reducing agent containing no carbon is hydrogen.

Preferably, the iron metal powder to be used as a starting powder in the present invention can be prepared by reducing an iron oxide with a reducing agent containing no carbon. The reducing agent may be the same as described above.

Examples of the iron oxide are α-$Fe_2O_3$, γ-$Fe_2O_3$ and $Fe_3O_4$. The iron oxide powder may be coated with an inorganic compound, which can be the same compound as described above.

When the iron oxide powder is not coated, the reducing temperature is preferably from 250° to 700° C., more preferably from 350° to 600° C. When the iron oxide powder is coated, the reducing temperature is preferably from 350° to 750° C., more preferably from 400° to 650° C. If the reducing temperature is too high, the particles are sintered together so that the produced particles have an average particle size larger than 0.2 μm. If the temperature is too low, the reduction to metal cannot be effected.

Alternatively, the iron metal ultrafine particles can be prepared and broken down by reducing the iron oxide powder, which is prepared by dehydrating an acicular iron oxyhydroxide in air or nitrogen gas at a temperature of not higher than 350° C., preferably from 200° to 350° C., more preferably from 250° to 330° C., with a reducing agent containing no carbon at a temperature not lower than 200° C., preferably from 200° to 400° C., more preferably from 250° to 330° C.

Specific examples of the iron oxyhydroxide are α-FeO(OH), β-FeO(OH), γ-FeO(OH), etc.

The iron oxyhydroxide powder, preferably δ-FeO(OH) may be coated with an inorganic coating compound. In this case, the dehydration temperature is not lower than 200° C., preferably from 200° to 700° C., more preferably from 350° to 600° C., in particular from 400° to 550° C., and the reducing temperature is preferably from 200° to 700° C., more preferably from 300° to 550° C., in particular from 350° to 500° C.

A purpose of the coating with the inorganic coating compound is to prevent change of the shape of the starting material (e.g. α-iron, iron oxide, iron oxyhydroxide, etc.) for synthesizing ε-iron carbide in the subsequent reaction(s). That is, the coating compound functions as a particle shape-keeping agent for the starting material, which suppresses sintering or growth of crystal particles during dehydration, reduction and/or carbonization.

The inorganic coating compound may be the same as described above.

The reducing agent is preferably hydrogen.

For example, fine particles of δ-FeO(OH) can be prepared by oxidation of ferrous hydroxide, which has been prepared through neutralization of a solution of a ferrous salt (e.g. sulfate, nitrate, chloride, perchlorate, etc.) and an alkali solution (e.g. NaOH, KOH, etc.), with an oxidizing agent (e.g. hydrogen peroxide, ammonium peroxodisulfate, etc.) to form δ-FeO(OH), optionally applying the protective inorganic compound on the δ-FeO(OH) particles or heating and dehydrating said particles.

Ferrous hydroxide can be prepared through the neutralizing reaction between the ferrous salt solution and the alkali solution, but is easily oxidized and very unstable in air. According to Shoichi Okamoto, Kagaku Kogaku Zassi, vol. 67, 1845 (1964), ferrous hydroxide is topotactically oxidized quickly with hydrogen peroxide at a temperature of 50° C. or lower to form δ-FeO(OH). In this reaction, before and after oxidation, the shape of the fine particles does not change, and formed δ-FeO(OH) is stable in air. In addition, only when the alkali is present in excess, can single phase δ-FeO(OH) be formed., and iron can contain various metals as solid solutions.

In another embodiment, the ε' iron carbide of the present invention contains at least one other metal which is present in a substitution solid solution state in iron.

Specific examples of the other metal are Co, Cu, Cr, Zn, Mn, V, Ti, Mo, W, Al, Sn, Nb, Zr, Mg, etc. They may be used singly or as a mixture of two or more of them.

In this case, the iron carbide has the composition formula of $\epsilon'\text{-}(Fe_{1-x}M_x)_{2.2}C$ in which M is the other metal and x is a number larger than 0 (zero) and smaller than 1 (one), preferably not larger than 0.8.

The other metal can be added to the Fe-base raw material or intermediates at any stage to have the other metal present in a solid solution state. The solid solution can be formed by a conventional method such as coprecipitation.

The amount of the other metal in the iron carbide varies with the kind of the other metal.

For example, Co is contained in the iron carbide in an amount of not larger 75% by mole, preferably not larger than 55% by mole, more preferably not larger than 40% by mole (based on the iron amount).

Cu is contained in the iron carbide in an amount of not larger 1% by mole, preferably not larger than 0.5% by mole, more preferably not larger than 0.2% by mole.

Cr is contained in the iron carbide in an amount of not larger 80% by mole, preferably not larger than 50% by mole, more preferably not larger than 20% by mole, most preferably not larger than 10% by mole, in particular not larger than 5% by weight, for example, not larger than 2% by mole.

Zn is contained in the iron carbide in an amount of not larger 10% by mole, preferably not larger than 8% by mole, more preferably not larger than 5% by mole.

Mn is contained in the iron carbide in an amount of not larger 5% by mole, preferably not larger than 3% by mole, more preferably not larger than 2% by mole.

V is contained in the iron carbide in an amount of not larger 80% by mole, preferably not larger than 60% by mole, more preferably not larger than 40% by mole, most preferably not larger than 20% by mole, in particular not larger than 10% by weight, especially not larger than 6% by mole, for example, not larger than 4% by mole.

Mo is contained in the iron carbide in an amount of not larger 40% by mole, preferably not larger than 20% by mole, more preferably not larger than 10% by mole.

W is contained in the iron carbide in an amount of not larger 35% by mole, preferably not larger than 20% by mole, more preferably not larger than 10% by mole.

Al is contained in the iron carbide in an amount of not larger 40% by mole, preferably not larger than 20% by mole, more preferably not larger than 10% by mole, in particular not larger than 4% by weight.

Sn is contained in the iron carbide in an amount of not larger 15% by mole, preferably not larger than 10% by mole, more preferably not larger than 5% by mole.

The other metals may be contained in combination of two or more of them.

In addition to the above other metals, nickel can be used when the material is coated with the inorganic coating compound to keep the shape of the raw materials. The content of nickel may be not larger 30% by mole, preferably not larger than 20% by mole, more preferably not larger than 10% by mole.

In an alternative embodiment, the other metal or its compound can be coated on the iron carbide by coating iron compound, namely α-iron, iron oxides or iron oxyhydroxides with the other metal or its compound in one step of the preparation process.

According to the second aspect of the present invention, there is provided ferromagnetic acicular ultrafine particles consisting essentially of $\epsilon'$ iron carbide represented by the composition formula:

$\epsilon'\text{-}Fe_{2.2}C$ having a major axis of about 0.05 to 0.5 μm, a minor axis of about 0.01 to 0.06 and an axial ratio of 4 to 20.

When the major axis is longer than 0.5 μm, the particle size increases so that the high recording density cannot be achieved or the particle has multi magnetic domains so that the coercive force tends to decrease, although the acicular ratio is increased. When the axial ratio is smaller than 4, the shape magnetic anisotropy is decreased so that large coercive force cannot be expected.

To produce the acicular $\epsilon'$ iron carbide particles of the present invention, acicular metal iron particles are reduced with a reducing and carbonizing agent containing carbon and optionally a reducing agent containing no carbon at a temperature not higher than 240° C., preferably from 180° to 240° C., more preferably from 195° to 225° C. The reducing and carbonizing agent containing carbon and the reducing agent containing no carbon are the same as described above.

The acicular iron particles can be coated with an inorganic compound, which may be the same as described above.

The acicular iron particles may be prepared by reducing acicular iron oxide (e.g. $\alpha\text{-}Fe_2O_3$, $\gamma\text{-}Fe_2O_3$ or $Fe_3O_4$) with a reducing agent to α-Fe. The reducing agent may be the same as described above.

The acicular iron oxide particles may be coated with an inorganic compound, which may be the same as described above.

When the iron oxide particles are not coated, the reducing temperature is from 200° to 700° C., preferably from 400° to 650° C. When the iron oxide particle is coated with the inorganic compound, the reducing temperature is from 350° to 750° C., preferably from 400° to 650° C.

Alternatively, the acicular iron particles may be prepared by dehydrating acicular iron oxyhydroxide particles in air or nitrogen gas to form $\alpha\text{-}Fe_2O_3$ and then reducing the iron oxide with the reducing agent.

Specific examples of the iron oxyhydroxide are α-FeO(OH), β-FeO(OH) and γ-FeO(OH).

The iron oxyhydroxide particles may be coated with the inorganic compound as above.

When the iron oxyhydroxide particles are not coated, the dehydration temperature is from 250° to 700° C., preferably from 400° to 650° C., and the reducing temperature is from 200° to 750° C., preferably from 300° to 500° C. When the iron oxyhydroxide particles are coated, a dehydration temperature is from 250° to 750° C., preferably from 400° to 650° C., and a reducing temperature is from 250° to 750° C., preferably from 350° to 600° C.

As in the case of the granular ferromagnetic ultrafine iron carbide particles of the present invention, the acicular ferromagnetic ultrafine iron carbide particles of the present invention may contain at least one other metal in a substitution solid solution state, or may be coated with at least one other metal or its compound.

The kinds and amounts of the other metals are the same as in case of the granular particles.

The reason why the inorganic coating compound is used is to maintain the original particle shape of the raw materials. The inorganic coating compound has no influence on formation of the $\epsilon'$ iron carbide of the present invention.

The following experiments explain the dependency of formed phases of iron carbide on the temperature in the carbonizing step.

Experiment 1

To an aqueous solution of ferrous sulfate ($FeSO_4.7H_2O$) (concentration: 0.4 mol/l) (1000 ml), an aqueous solution of sodium hydroxide (concentration: 1.6 mol/l) (1000 ml) was added for neutralizing the ferrous sulfate solution to obtain an aqueous suspension of ferrous hydroxide ($Fe(OH)_2$). To this suspension, an aqueous solution of hydrogen peroxide, in an amount sufficient for oxidizing ferrous hydroxide, was added in one portion to obtain a brown precipitate. The precipitate was washed with water until the pH of the wash water became about 7. To the washed precipitate (20 g), an aqueous solution of sodium silicate (concentration: 0.2%) (2000 ml) was added, and the mixture was well stirred and filtered, followed by drying at room temperature. The X-ray diffraction pattern of this sample corresponded to that of δ-FeO(OH) in ASTM X-ray Powder Data File 13-87. From the electron microscopic photograph, the average particle size was about 0.02 μm.

The sample was heated and dehydrated at 600° C. and then reduced in a hydrogen stream to α-Fe. Thereafter, the α-Fe particles were further carbonized with a mixture of carbon monoxide and hydrogen (volume ratio of 1:1) at various temperatures shown in Table 1. The product was identified with X-ray diffraction analysis. The results are shown in Table 1.

TABLE 1

| Temperature (°C.) | Phases of iron carbide |
|---|---|
| 180 | $\epsilon'$-$Fe_{2.2}C$ > α-Fe |
| 210 | $\epsilon'$-$Fe_{2.2}C$ |
| 240 | $\epsilon'$-$Fe_{2.2}C$ >> $\chi$-$Fe_5C_2$ |
| 280 | $\chi$-$Fe_5C_2$ >> $\epsilon'$-$Fe_{2.2}C$ |
| 330 | $\chi$-$Fe_5C_2$ >> $\theta$-$Fe_3C$ |
| 400 | $\theta$-$Fe_3C$ >> $\chi$-$Fe_5C_2$ |
| 450 | $\theta$-$Fe_cC$ |

Since the phases in the product produced through carbonization vary with the gas composition to be used for carbonization and the size and shape of the raw materials, the above results are not necessarily applied to other cases, and it is very difficult to select critical limits for various reaction conditions.

However, it can be said that, for the production of $\epsilon'$ iron carbide, the fine particles of α-Fe should be present as the main raw material at the start of carbonization, and the carbonization should be carried out at a comparatively low temperature of not higher than 250° C.

Experiment 2

A raw material consisting of α-$Fe_2O_3$ particles having an average particle size of 0.5 μm was reduced in a hydrogen stream to α-Fe and then carbonized with a mixture of carbon monoxide and hydrogen (volume ratio of 1:1) at various temperatures as in Experiment 1. The product was identified by X-ray diffraction analysis. The results are substantially the same as in Experiment 1.

PREFERRED EMBODIMENTS OF THE INVENTION

The present invention will be explained in detail by following examples.

Example 1

In a ceramic boat, α-FeO(OH) powder having an average particle size of 0.5 μm and an axial ratio of 10 (2 g) was charged and then heated and dehydrated in a tube heater at 280° C. for 2 hours to obtain α-$Fe_2O_3$ powder. After replacing the interior atmosphere with nitrogen, the α-$Fe_2O_3$ powder was heated to 300° C. and then reduced with hydrogen at the same temperature for 4 hours.

The product was subjected to X-ray diffraction and Mössbauer spectroscopy to confirm that the most part consisted of α-Fe. From the results of X-ray diffraction and electron microscopic photography, the average particle size was calculated to be about 0.02 μm.

The product was cooled to 210° C. and reacted with a mixture of carbon monoxide and hydrogen (volume ratio of 1:1) for 3 hours followed by cooling down to room temperature to obtain black powder having an average particle size of 0.02 μm.

Figure 1:
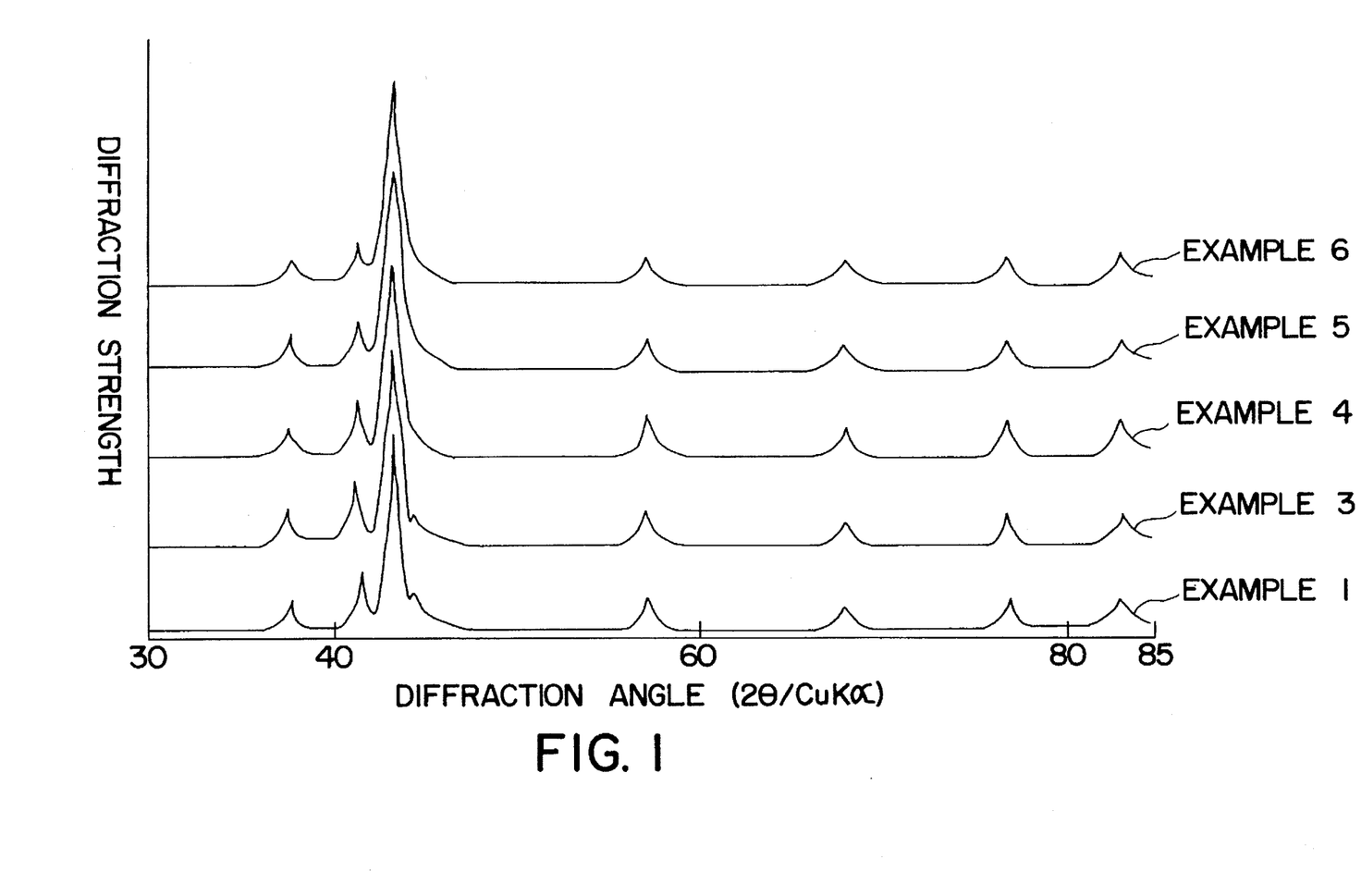
FIG. 1 shows X-ray diffraction patterns of ε' iron carbide powders prepared in Examples 1 and 3 through 6.

The X-ray diffraction pattern of the produced iron carbide powder is shown in FIG. 1. According to the X-ray diffraction analysis, the lattice spacings were 2.37, 2.16, 2.08, 1.60, 1.37, 1.24 and 1.16 Å. They coincide well with the lattice spacings of $\epsilon'$-$Fe_{2.2}C$ of 2.38, 2.16, 2.08, 1.60, 1.37, 1.24 and 1.16 Å which are reported by Hofer et al in J. Amer. Chem. Soc., vol 81, 1576 (1959).

The magnetic characteristics of the black powder were measured with a sample-vibration type magnetometer. The black powder had saturation magnetization of 112.0 emu/g, residual magnetization of 57.1 emu/g and coercive force of 1036 Oe.

Comparative Example 1

In the same ceramic boat, the same α-FeO(OH) powder as used in Example 1 was charged. After replacing the interior atmosphere with nitrogen, the powder was heated to 340° C. and treated with a mixture of carbon monoxide and hydrogen (volume ratio of 1:1) at the same temperature for 5 hours.

According to the X-ray diffraction, the produced powder consisted of $Fe_3O_4$ and $\chi$-$Fe_5C_2$ and has an average particle size of 0.04 μm. The powder had saturation magnetization, residual magnetization and coercive force of 68.3 emu/g, 25.6 emu/g and 530 Oe, respectively.

Comparative Example 2

In the same manner as in Example 1 but treating the α-FeO(OH) powder with the mixture of carbon monoxide and hydrogen at 340° C., the iron carbide powder was produced.

The produced iron carbide powder had the X-ray diffraction pattern corresponding to $\chi$-$Fe_5C_2$ and an average particle size of 0.02 μm. The powder had saturation magnetization, residual magnetization and coercive force of 92.3 emu/g, 42.5 emu/g and 810 Oe, respectively.

Example 2

In the same manner as in Example 1 but using a mixture of carbon monoxide and hydrogen in a volume ratio of 1:4, the iron carbide powder was produced.

The powder had saturation magnetization, residual magnetization and coercive force of 116.6 emu/g, 58.2 emu/g and 1050 Oe, respectively. The intermediate product (α-Fe) and the final product ($\epsilon'$-$Fe_{2.2}C$) had substantially the same particle size as that produced in Example 1.

Examples 3–6

In the same manner as in Experiment 1 but replacing 2, 6, 10 or 20% by mole of iron elements in the starting material $FeSO_4 \cdot 7H_2O$ with nickel elements, $FeSO_4 \cdot 7H_2O$ was neutralized with sodium hydroxide to obtain an aqueous suspension of $Fe(OH)_2$. Then the $Fe(OH)_2$ particles were oxidized by bubbling air to obtain $\alpha$-FeO(OH). X-ray diffraction analysis confirmed that the whole product consisted of $\alpha$-FeO(OH) powder having substantially the same average particle size as that produced in Example 1. The axial ratio increased as the content of nickel elements increased, so that $\alpha$-FeO(OH) containing 20% by mole of nickel elements had about twice larger axial ratio than that containing no nickel.

From the $\alpha$-FeO(OH) powder produced in the above, iron carbide was produced in the same manner as in Example 1. The X-ray diffraction patterns of the iron carbide powders prepared in Examples 3 through 6 are shown in FIG. 1.

The powder had saturation magnetization, residual magnetization and coercive force shown in Table 2.

TABLE 2

| Example No. | Nickel content (% by mole) | Saturation magnetization (emu/g) | Residual magnetization (emu/g) | Coercive force (Oe) |
| --- | --- | --- | --- | --- |
| 3 | 2 | 114.2 | 51.1 | 972 |
| 4 | 6 | 120.1 | 50.5 | 919 |
| 5 | 10 | 126.4 | 50.4 | 900 |
| 6 | 20 | 122.6 | 48.9 | 790 |

In these Examples, it was confirmed that, as the content of nickel elements increased, the average particle sizes of the intermediate product ($\alpha$-Fe powder) and the final product ($\epsilon$ iron carbide) decreased.

Example 7

A 1.6 mol/l aqueous solution of sodium hydroxide (1 liter) was added to a 0.4 mol/l aqueous solution of ferrous sulfate ($FeSO_4 \cdot 7H_2O$) (1 liter) to obtain a suspension of ferrous hydroxide ($Fe(OH)_2$). To this suspension, a 10% aqueous solution of hydrogen peroxide (100 ml) was added to obtain a brown precipitate.

Then, the brown precipitate was mixed with water glass No. 3 (0.5 g), stirred, washed with water until the pH of the wash water became about 7, and filtered, followed by drying at room temperature and grinding to obtain a sample.

The X-ray diffraction pattern of this sample corresponded to that of $\delta$-FeO(OH). From the electron microscopic photograph, the average particle size was about 0.03 μm.

In a ceramic boat, the sample powder was charged and then heated and dehydrated in a tube heater at 600° C. for 3 hours to obtain $\alpha$-$Fe_2O_3$. After replacing the interior atmosphere with nitrogen, the temperature was lowered to 450° C. and the $\alpha$-$Fe_2O_3$ powder was reduced with hydrogen. The X-ray diffraction of the product obtained in this step confirmed that the product consisted of a single phase of $\alpha$-Fe. From the electron microscopic photograph of the product, its average particle size was about 0.03 μm.

The product obtained in the above step was cooled to 210° C. and then reacted with the mixture of carbon monoxide and hydrogen (volume ratio of 1:1) for 5 hours followed by cooling down to room temperature to obtain black powder having an average particle size of 0.03 μm.

Figure 2:
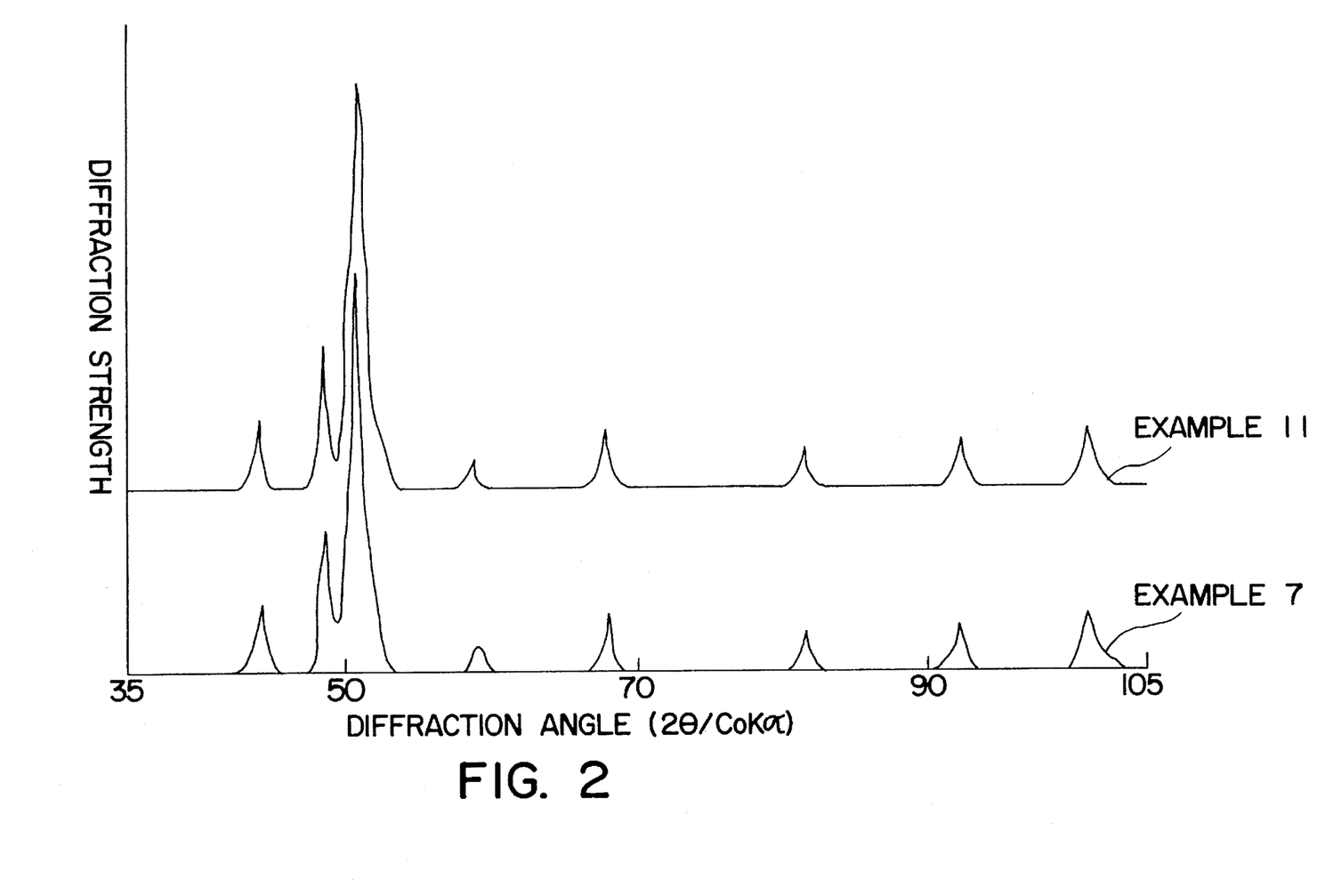
FIG. 2 shows X-ray diffraction patterns of ε' iron carbide powders prepared in Examples 7 and 11.

The X-ray diffraction pattern of the produced iron carbide powder is shown in FIG. 2. According to the X-ray diffraction analysis, the lattice spacings were 2.38, 2.17, 2.08, 1.60, 1.38, 1.24 and 1.16 Å. The black powder had saturation magnetization, residual magnetization and coercive force of 65.2 emu/g, 31.4 emu/g and 1240 Oe, respectively.

Examples 8 and 9

In the same manner as in Example 7 but dehydrating the $\delta$-FeO(OH) powder at 400° C. (Example 8) or 500° C. (Example 9), the iron carbide was produced.

Both products of Examples 8 and 9 had an X-ray diffraction pattern corresponding to that of $\epsilon'$-$Fe_{2.2}C$ and an average particle size of about 0.03 μm.

Example 10

In the same manner as in Example 7 but reducing the $\delta$-FeO(OH) powder at 500° C., the iron carbide was produced.

The product had an X-ray diffraction pattern corresponding to that of $\epsilon$-$Fe_{2.2}C$ and an average particle size of about 0.03 μm.

Example 11

A 4.0 mol/l aqueous solution of sodium hydroxide (1 liter) was added to a 0.4 mol/l aqueous solution of ferrous sulfate ($FeSO_4 \cdot 7H_2O$) (1 liter) to obtain a suspension of ferrous hydroxide ($Fe(OH)_2$). To this suspension, a 10% aqueous solution of hydrogen peroxide (100 ml) was added to obtain a brown precipitate.

Then, the brown precipitate was mixed with water glass No. 3 (0.5 g), stirred, washed with water until the pH of the wash water became about 7, and filtered, followed by drying at room temperature and grinding to obtain a sample.

The X-ray diffraction pattern of this sample corresponded to that of $\delta$-FeO(OH). From the electron microscopic photograph, the average particle size was about 0.05 μm.

In a ceramic boat, the sample powder was charged and then heated and dehydrated in a tube heater at 600° C. for 3 hours to obtain $\alpha$-$Fe_2O_3$. After replacing the interior atmosphere with nitrogen, the temperature was lowered to 500° C. and the $\alpha$-$Fe_2O_3$ powder was reduced with hydrogen. The reduced product was further cooled down to 210° C. and reacted with a mixture of carbon monoxide and hydrogen (volume ratio of 1:1) for 5 hours followed by cooling down to room temperature to obtain black powder having an average particle size of 0.05 μm.

The X-ray diffraction pattern of the produced iron carbide powder is shown in FIG. 2.

The magnetic characteristics of the products of Examples 7 through 11 are summarized in Table 3.

TABLE 3

| Example No. | Saturation magnetization (emu/g) | Residual magnetization (emu/g) | Coercive force (Oe) |
| --- | --- | --- | --- |
| 7 | 65.2 | 31.4 | 1240 |
| 8 | 68.0 | 32.4 | 1170 |
| 9 | 66.7 | 31.9 | 1210 |
| 10 | 63.5 | 30.0 | 1260 |
| 11 | 102.4 | 48.5 | 1285 |

Example 12

$\alpha$-FeO(OH) powder having a major axis of 0.5 μm and an axial ratio of 10 (20 g) was dispersed in a 0.2% aqueous solution of sodium silicate and pH of the dispersion was adjusted to about 5 with 1N HCl, followed by washing with water, filtration, drying and grinding to obtain sample powder.

In a ceramic boat, the sample powder was charged and then heated and dehydrated in a tube heater at 600° C. for 3 hours to obtain $\alpha$-$Fe_2O_3$. After replacing the interior atmosphere with nitrogen, the $\alpha$-$Fe_2O_3$ powder was cooled down to 450° C. and reduced with hydrogen at the same temperature for 1 (one) hour. The X-ray diffraction analysis confirmed that the product consisted of a single phase of $\alpha$-Fe. From the electron microscopic photograph, the product had a major axis of about 0.4 µm.

The reduced product was further cooled down to 210° C. and reacted with a mixture of carbon monoxide and hydrogen (volume ratio of 1:1) for 5 hours followed by cooling down to room temperature to obtain black powder having a major axis of 0.4 µm and an axial ratio of 8.

According to the X-ray diffraction analysis, the lattice spacings were 2.38, 2.17, 2.08, 1.60, 1.38, 1.24 and 1.16 Å. The powder had saturation magnetization, residual magnetization and coercive force of 117.6 emu/g, 57.3 emu/g and 1410 Oe, respectively.

Comparative Example 3

In the same manner as in Example 12 but treating the $\alpha$-FeO(OH) powder with the carbon monoxide/hydrogen mixture at 340° C., the iron carbide was produced.

The X-ray diffraction pattern corresponded to that of $\chi$-$Fe_5C_2$, and the product had an major axis of 0.4 µm and an axial ratio of 8. The powder had saturation magnetization, residual magnetization and coercive force of 101.5 emu/g, 46.8 emu/g and 890 Oe, respectively.

Example 13

In the same manner as in Example 12 but using a mixture of carbon monoxide and hydrogen in a volume ratio of 1:4, the iron carbide was produced.

The iron carbide powder had saturation magnetization, residual magnetization and coercive force of 121.8 emu/g, 58.4 emu/g and 1160 Oe, respectively.

Examples 14 and 15

In the same manner as in Example 12 but dehydrating the $\alpha$-FeO(OH) powder at 400° C. (Example 14) or 500° C. (Example 15), the iron carbide was produced.

Both products of Examples 14 and 15 had an X-ray diffraction pattern corresponding to that of $\epsilon'$-$Fe_{2.2}C$, a major axis of about 0.4µ and an axial ratio of about 8.

Example 16

In the same manner as in Example 12 but using $\alpha$-FeO(OH) powder having a major axis of 0.25 µm and an axial ratio of 10, iron carbide was produced.

The product had the X-ray diffraction pattern corresponding to that of $\epsilon'$-$Fe_{2.2}C$, a major axis of about 0.2 µm and an axial ratio of about 8.

Figure 3:
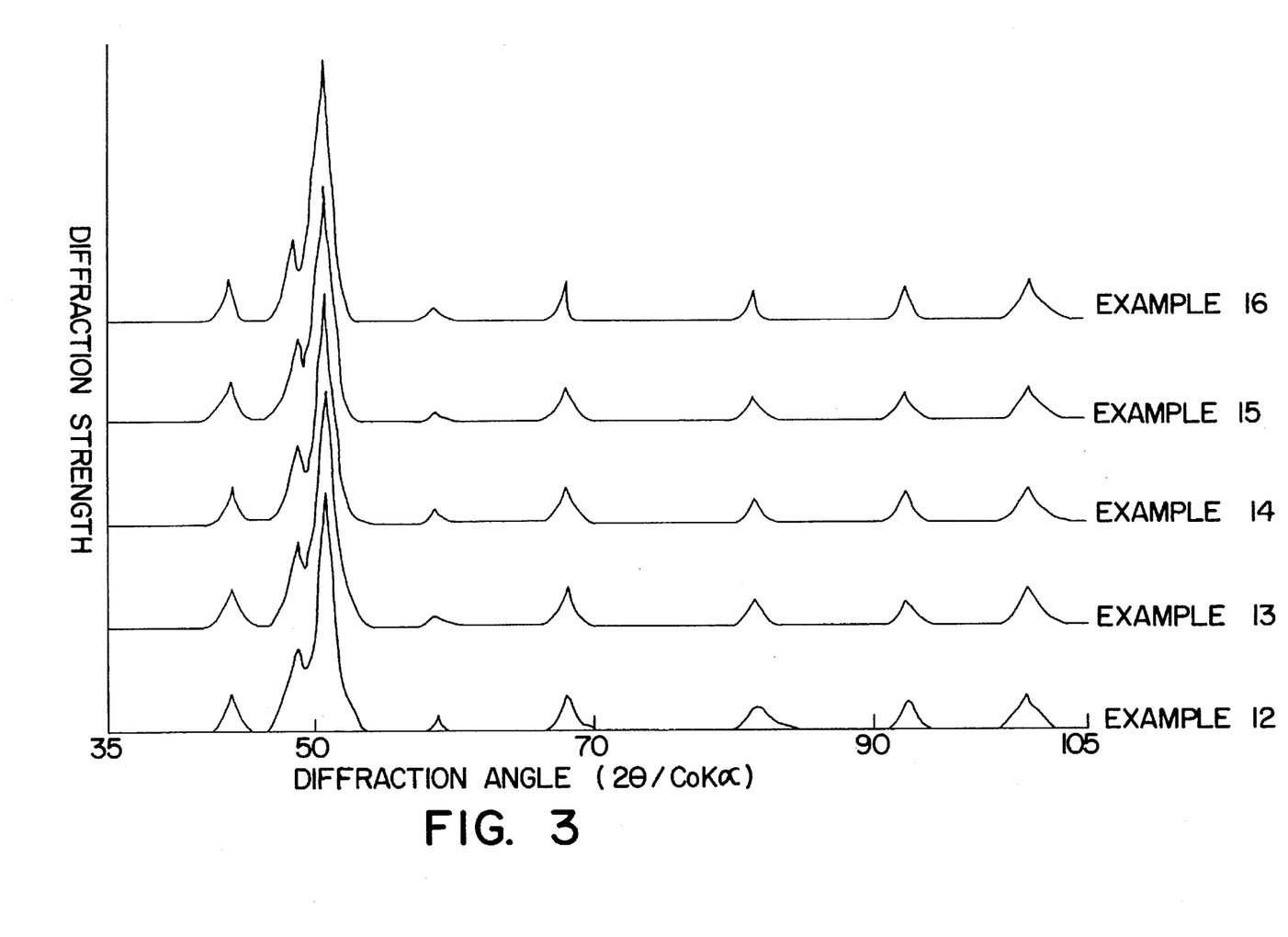
FIG. 3 shows X-ray diffraction patterns of ε' iron carbide powders prepared in Examples 12 through 16.

The X-ray diffraction patterns of the iron carbide powders produced in Examples 12 through 16 are shown in FIG. 3.

The magnetic characteristics of the iron carbide powders produced in Examples 12 through 16 and Comparative Example 3 are summarized in Table 4.

TABLE 4

| Example No. | Saturation magnetization (emu/g) | Residual magnetization (emu/g) | Coercive force (Oe) |
|---|---|---|---|
| 12 | 117.6 | 57.3 | 1410 |
| Comp. 3 | 101.5 | 46.8 | 890 |
| 13 | 121.8 | 55.9 | 1160 |
| 14 | 110.4 | 51.0 | 1435 |
| 15 | 114.3 | 53.3 | 1450 |
| 16 | 105.7 | 50.0 | 1610 |

Example 17

Two grams of cubic shape particles of $Fe_3O_4$ containing 33% by mole of cobalt and having an average particle size of 0.02 µm surfaces of which were coated with 5% by weight of $SiO_2$-$Al_2O_3$ based on the weight of iron atoms was charged in a ceramic boat and placed in a tubular furnace. After replacing the interior atmosphere of the furnace with nitrogen gas, the iron oxide powder was heated to 370° C. and reduced with hydrogen at the same temperature for 2 hours.

An X-ray diffraction pattern confirmed that the intermediate product essentially consisted of $\alpha$-iron.

Then, the intermediate product was cooled to 200° C. and reacted with a mixture of carbon monoxide and hydrogen (a volume ratio of 1/1) for 5 hours. Thereafter, the product was cooled to room temperature to obtain black powder having an average particle size of 0.02 µm.

Figure 4:
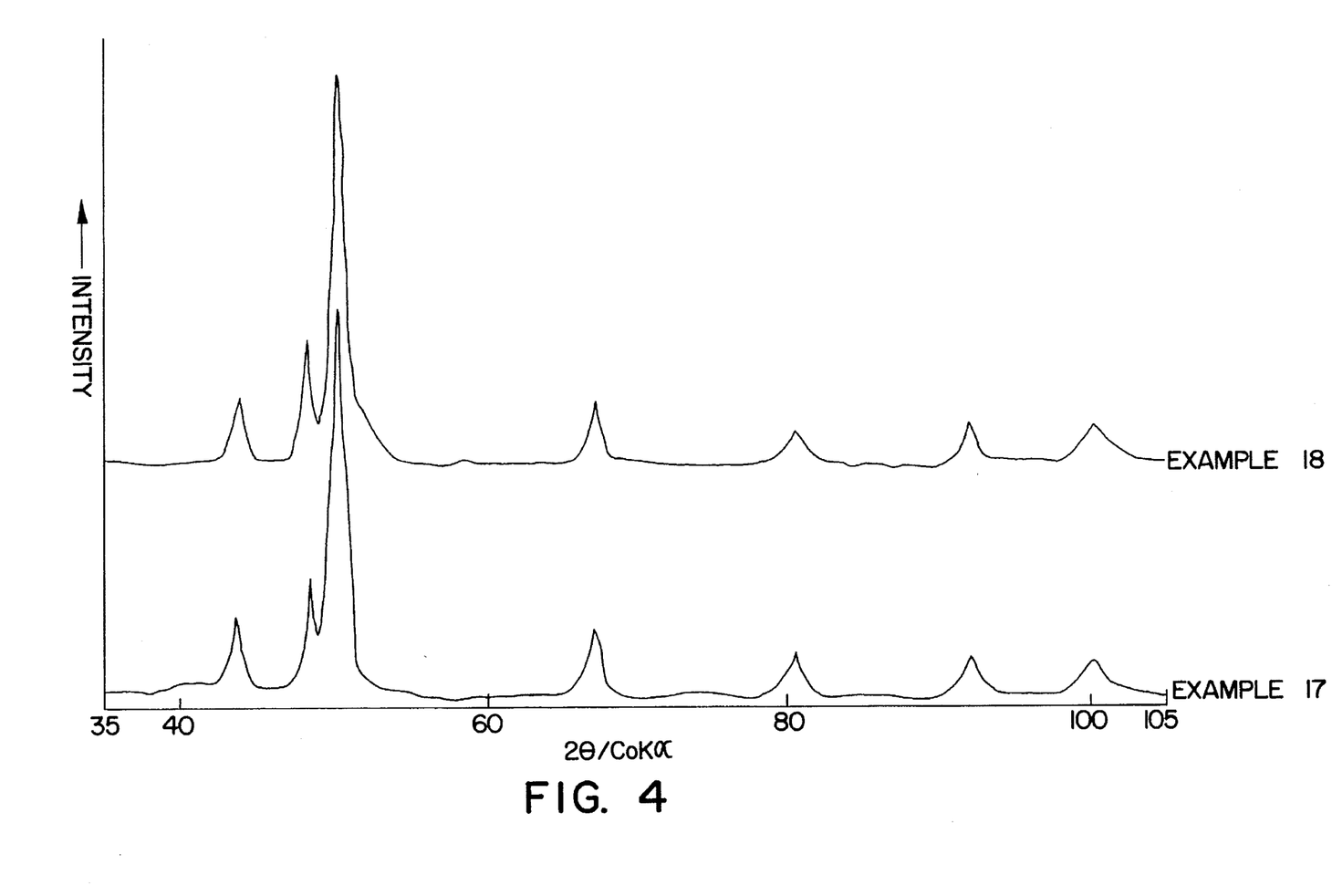
FIG. 4 shows X-ray diffraction patterns of ε' iron carbide powders prepared in Examples 17 and 18.

The product had an X-ray diffraction pattern corresponding to that of $\epsilon'$-$Fe_{2.2}C$ as shown in FIG. 4.

The black powder had saturation magnetization, residual magnetization and coercive force of 86.6 emu/g, 38.6 emu/g and 1270 Oe, respectively.

Example 18

Two grams of cubic shape particles of $Fe_3O_4$ containing 5% by mole of cobalt and having an average particle size of 0.04 µm surfaces of which were coated with 5% by weight of $SiO_2$-$Al_2O_3$ based on the weight of iron atoms was charged in a ceramic boat and placed in a tubular furnace. After replacing the interior atmosphere of the furnace with nitrogen gas, the iron oxide powder was heated to 370° C. and reduced with hydrogen at the same temperature for 3 hours.

An X-ray diffraction pattern confirmed that the intermediate product essentially consisted of $\alpha$-iron.

Then, the intermediate product was cooled to 200° C. and reacted with a mixture of carbon monoxide and hydrogen (a volume ratio of 1/1) for 6 hours. Thereafter, the product was cooled to room temperature to obtain black powder having an average particle size of 0.04 µm.

The product had an X-ray diffraction pattern corresponding to that of $\epsilon'$-$Fe_{2.2}C$ as shown in FIG. 4.

The black powder had saturation magnetization, residual magnetization and coercive force of 102.4 emu/g, 49.3 emu/g and 1240 Oe, respectively.

What is claimed is:

1. Ferromagnetic granular ultrafine particles consisting of single phase $\epsilon'$ iron carbide represented by the composition formula:

$\epsilon'$-Fe$_{2.2}$C having an average particle size of about 0.03 to 0.2 μm.

2. A method for producing ferromagnetic granular ultrafine particles consisting of single phase $\epsilon'$ iron carbide represented by the composition formula:

$\epsilon'$-Fe$_{2.2}$C having an average particle size of about 0.03 to 0.2 μm, which method comprises reacting iron metal powder having an average particle size of 0.03 to 0.2 μm with a reducing and carbonizing agent containing carbon and optionally a reducing agent containing no carbon at a temperature of 200°–210° C.

3. The method according to claim 2, wherein said iron metal powder is α-Fe powder which consists essentially of iron atoms.

4. The method according to claim 2, wherein the reaction temperature is from 180° to 240° C.

5. The method according to claim 2, wherein said carbonizing and reducing agent is a mixture of carbon monoxide and hydrogen.

6. The method according to claim 2, wherein said carbonizing and reducing agent is at least one compound selected from the group consisting of methane, ethane, propane and butane.

7. The method according to claim 2, wherein said optional reducing agent is hydrogen.

8. The method according to claim 2, which further comprises reducing granular iron oxide powder with a reducing agent containing no carbon at a temperature not lower than 200° C. to prepare iron metal powder.

9. The method according to claim 8, wherein said iron oxide is selected from the group consisting of α-Fe$_2$O$_3$, γ-Fe$_2$O$_3$ and Fe$_3$O$_4$.

10. The method according to claim 6, wherein said reducing agent is hydrogen.

11. The method according to claim 2 which further comprises dehydrating an acicular iron oxyhydroxide in air or nitrogen gas at a temperature of not higher than 350° C. to obtain iron oxide powder and breaking down said iron oxide powder by reducing said iron oxide powder with a reducing agent containing no carbon at a temperature not lower than 200° C. to prepare iron metal powder.

12. The method according to claim 11, wherein said acicular iron oxyhydroxide is at least one member selected from the group consisting of α-FeO(OH), β-FeO(OH) and γ-FeO(OH).

13. The method according to claim 11, wherein the dehydration temperature is from 200° to 350° C., and the reducing temperature is from 200° to 400° C.

14. Ferromagnetic acicular ultrafine particles consisting of single phase $\epsilon'$ iron carbide represented by the composition formula:

$\epsilon'$-Fe$_{2.2}$C having a major axis of about 0.05 to 0.5 μm, a minor axis of about 0.01 to 0.06 and an axial ratio of 4 to 20.

15. A method for producing ferromagnetic acicular ultrafine particles consisting of single phase $\epsilon'$ iron carbide represented by the composition formula:

$\epsilon'$-Fe$_{2.2}$C having a major axis of about 0.05 to 0.5 μm, a minor axis of about 0.01 to 0.06 and an axial ratio of 4 to 20, which method comprises reacting acicular iron metal powder having an average particle size of 0.03 to 0.2 μm with a reducing and carbonizing agent containing carbon and optionally a reducing agent containing no carbon at a temperature of 200°–210° C.

16. The method according to claim 15, wherein the reaction temperature is from 180° to 240° C.

17. The method according to claim 15, wherein said carbonizing and reducing agent is a mixture of carbon monoxide and hydrogen.

18. The method according to claim 15, wherein said carbonizing and reducing agent is at least one compound selected from the group consisting of methane, ethane, propane and butane.

19. The method according to claim 15, wherein said optional reducing agent is hydrogen.

20. The method according to claim 15, which further comprises reducing acicular iron oxide powder with a reducing agent containing no carbon at a temperature to form acicular α-Fe.

21. The method according to claim 20, wherein the reducing temperature is from 200° to 700° C.

22. The method according to claim 20, wherein the reducing agent is hydrogen.

23. The method according to claim 15, which further comprises dehydrating acicular iron oxyhydroxide powder in air or nitrogen gas at a temperature of not higher than 350° C. to form α-Fe$_2$O$_3$ powder and reducing acicular α-Fe$_2$O$_3$ powder with a reducing agent containing no carbon at a temperature not lower than 200° C. to prepare iron metal powder.

24. The method according to claim 23, wherein said iron oxyhydroxide is selected from the group consisting of α-FeO(OH), β-FeO(OH) and γ-FeO(OH).

25. Ferromagnetic granular ultrafine particles consisting essentially of single phase $\epsilon'$ iron carbide represented by the composition formula:

$\epsilon'$-(Fe$_{1-x}$M$_x$)$_{2.2}$C having an average particle size of about 0.03 to 0.2 μm, in which M is at least one other metal selected from the group consisting of Co, Cu, Cr, Zn, Mn, V, Mo, W, Al and Sn, in a substitution solid state solution, and x is not larger than 75% by mole of Co, not larger than 1% by mole of Cu, not larger than 80% by mole of Cr, not larger than 10% by mole of Zn, not larger than 5% by mole of Mn, not larger than 80% by mole of V, not larger than 40% by mole of Mo, not larger than 35% by mole of W, not larger than 40% by mole of Al, and not larger than 15% by mole of Sn, all amounts being based on the amount of iron.

26. Ferromagnetic granular ultrafine particles consisting essentially of single phase $\epsilon'$ iron carbide represented by the composition formula:

$\epsilon'$-(Fe$_{1-x}$M$_x$)$_{2.2}$C having a major axis of about 0.05 to 0.5 μm, a minor axis of about 0.01 to 0.06 and an axial ratio of 4 to 20, in which M is at least one other metal selected from the group consisting of Co, Cu, Cr, Zn, Mn, V, Mo, W, Al and Sn, in a substitution solid state solution, and x is not larger than 75% by mole of Co, not larger than 1% by mole of Cu, not larger than 80% by mole of Cr, not larger than 10% by mole of Zn, not larger than 5% by mole of Mn, not larger than 80% by mole of V, not larger than 40% by mole of Mo, not larger than 35% by mole of W, not larger than 40% by mole of Al, and not larger than 15% by mole of Sn, all amounts being based on the amount of iron.

* * * * *